Figure 1:
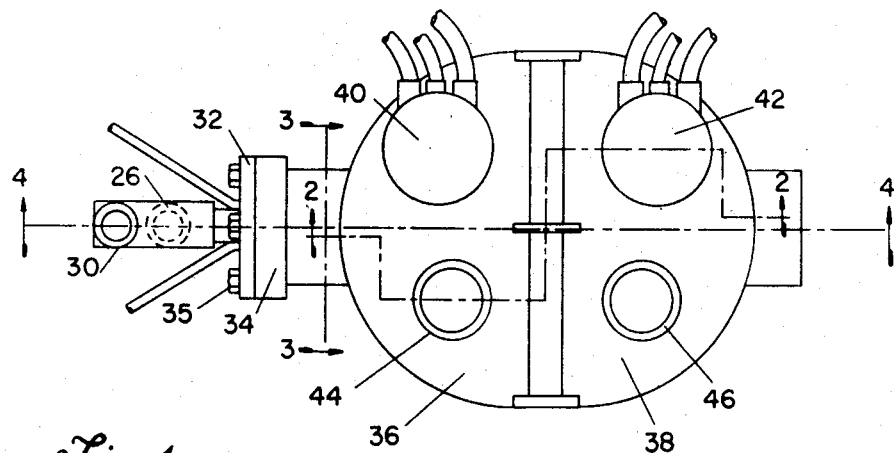

Jan. 5, 1960    K. D. LANTZ ET AL    2,919,710
TWO-WAY FREEZE VALVE

Filed Aug. 24, 1956    2 Sheets-Sheet 1

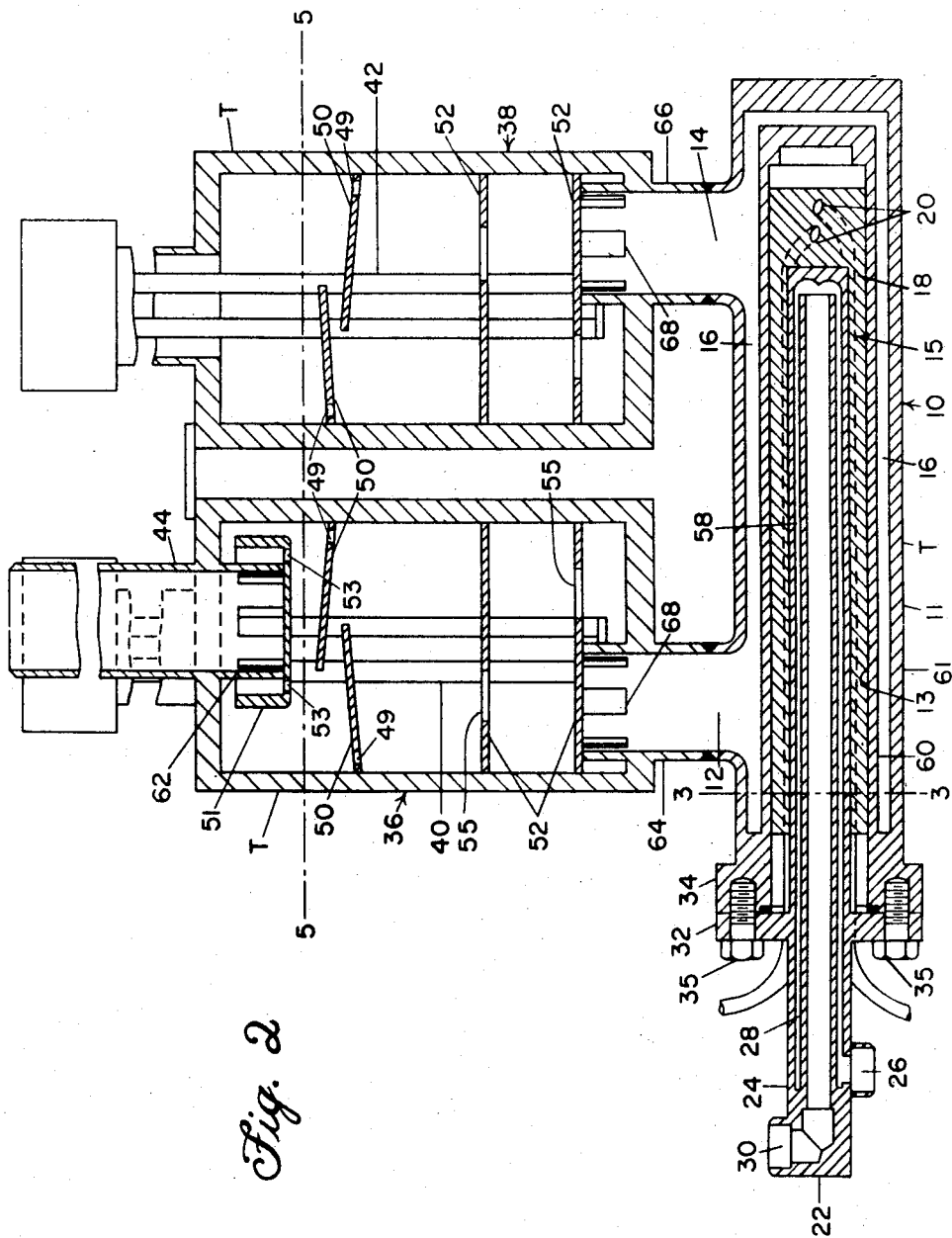

United States Patent Office 2,919,710
Patented Jan. 5, 1960

2,919,710
TWO-WAY FREEZE VALVE

Kenneth D. Lantz, Saratoga Springs, and Phillip M. Clark, Scotia, N.Y., assignors to the United States of America as represented by the United States Atomic Energy Commission Application August 24, 1956, Serial No. 606,178

7 Claims. (Cl. 137—74)

This invention relates to valves for regulating the flow of a liquid metal or a gas through a line conduit or pipe and more particularly relates to a valve in which the flow of either gas or liquid is valved by a frozen plug of the liquid metal.

The present invention is particularly suitable for use in situations where it is desired to valve a gas or a corrosive liquid metal. An example of such a situation occurs in the nuclear reactor art where liquid sodium is used as a heat transfer medium for transferring heat from a nuclear reactor to a site where the heat may be economically used. A gas such as helium is generally used to move the sodium through lines in the reactor. As a result of passage through a nuclear reactor, considerable radioactivity is induced in the liquid sodium. In such circumstances it becomes imperative for safety reasons to provide a leak tight barrier to the passage of any radioactive gas, vapor or liquid.

Conventional mechanical valves for the control of liquid metals such as sodium have heretofore been proposed. Because of the corrosive nature of many liquid metals, the seats of liquid metal valves are generally required to be metal against metal. Safety factors demand that a gas tight seal be provided such that leakage of gas should be at least less than .005 micron cubic feet per hour. We have conducted exhaustive tests which indicate that even with the utmost care conventional mechanical valves for a liquid metal cannot be made so that their seats will retain the required gas seal tightness. Our tests have shown that, usually after the first closure in such valves, the seats are so corroded and deformed that intolerable leaks will occur.

Accordingly, it is an object of the invention to provide a freeze valve for a corrosive liquid such as sodium and an inert gas such as helium wherein a frozen liquid presents a mass spectrometer leak tight barrier to the passage of gas.

Another object of the invention is to provide improved apparatus for valving a liquid or a gas in which the solidified liquid provides the required valving.

A further object of this invention is to provide apparatus for valving fluids in which no moving parts are involved.

With these and other objects in mind the present invention contemplates the provision, in a line containing a fusible metal, of a first zone provided with heating means for liquefying the metal and cooling means to freeze the liquefied metal in said zone, thereby forming a mass spectrometer leak tight seal to the passage of any liquid or gas. In addition, the invention contemplates the provision of a second zone associated with said first zone and containing means for removing entrained liquid or vapors from the exiting gas stream, thus insuring a sufficient supply of liquid in said first zone to form the leak tight seal.

For a better understanding of the invention reference may be had to the following description and drawings which illustrate a preferred embodiment of our invention. In the drawings:

Figure 1 is a top plan view illustrating an apparatus constructed in accordance with our invention and illustrating an arrangement of certain of the parts of the valve.

Figure 2 is a vertical view partly in section of Figure 1, the upper portion of which is taken along line 2—2 of Figure 1 and the lower portion of which is taken along line 4—4 of Figure 1, the division between the upper and lower portion being taken along line 5—5 of Figure 2.

Figure 3:
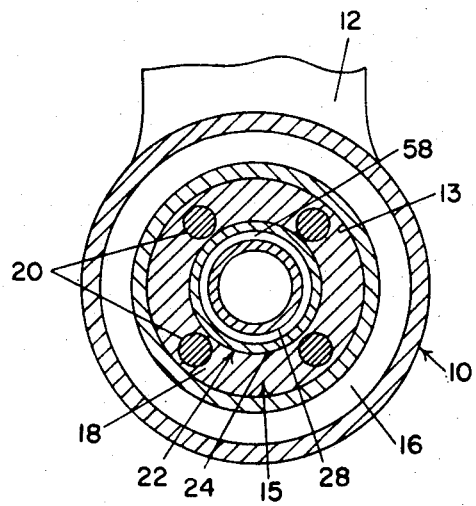

Figure 3 is a cross-sectional view taken along the line 3—3 of Figure 2 to illustrate particularly the elements of the first zone referred to.

As shown in Figure 2, the freeze valve of the present invention is illustrated as a generally U-shaped apparatus having enlarged legs wherein the base of the U comprises the said first zone, or valving portion, indicated generally at 10. The second or de-entrainment zone comprises the enlarged legs of the U, the legs being designated generally by numerals 36 and 38.

The valving zone portion 10 comprises a cylindrical casing 11 formed of two concentric, closed-end cylindrical walls or pipes 60 and 61, made of a corrosion resistant material such as stainless steel, which are nested and joined at their open ends to form a well 13 having spaced double walls. The outer wall 61 of the casing 11 is provided with an inlet port 12 near one end and an outlet port 14 near the other. It is thus seen that the double walls of the casing define an annular passage 16 for the flow of fluid from the inlet port 12 to the outlet port 14.

The well 13, as illustrated in transverse section in Figure 3, receives a heating assembly, generally indicated by reference numeral 15, which comprises a longitudinally counter-bored, heat conductive block 18, preferably made of a heat conductive metal such as copper, and an electrically energized heating element 20 such as a "Calrod" unit which is imbedded in the block 18 as by casting. The heating element is substantially coextensive with the passage 16. Within the bore of the block 18 there is a cooling unit 22 which is also substantially coextensive with passage 16. The cooling unit 22 comprises two spaced, coaxial pipes 24 and 28 joined together and mutually sealed at the outer end and forming an annular passage 58. The outer pipe 24 is capped at the inward end and has a radial port 26 near the outer end for transmitting a fluid coolant such as compressed air or water. The inward end of inner pipe 28 is open and spaced from the capped end of outer pipe 24 to provide a passage between the interior of inner pipe 28 and the annular passage 58. The inner pipe 28 has a port 30 near its outer end for transmitting coolant. The outer pipe has a flange 32 which is adapted to be secured by bolts 35 to a mating flange 34 on the casing 10.

With reference now to Figures 1 and 2, the second or de-entrainment zone of the valve comprises a pair of semi-cylindrical bubble chambers 36 and 38 having their flat sides in face to face relationship. The upper end of each bubble chamber 36 and 38 is provided with conduits 44 and 46 respectively for passing fluid to or from the interior of each chamber. The conduit 44 extends a short distance inwardly into the chamber 36 and is there sealed at its periphery to the base of a cup 51 of larger diameter than the conduit. The portion of the pipe 44 within the cup 51 has slots 62 which permit passage of fluid into or from chamber 36. A similar cup is joined to the bottom edge of conduit 46 which is of the same construction but is not shown in Figure 2 for convenience of illustration. To flow into or from chamber 36, a fluid must pass over the wall of and into cup 51 and through the slots 62. Small drain holes 53 are provided in the bottom of cup 51 to drain off collected liquid.

A short distance below the cups 51 each bubble chamber 36 and 38 is provided with a pair of baffles 50 extending across a major portion of the chamber cross-section. The baffles overlap but are angularly disposed relative to the longitudinal axis of the chamber and relative to each other to cause fluid to flow against, over and between the baffles. Drainage openings 49 are provided at the low point of each baffle.

The lower portion of each chamber is provided with a second pair of baffles 52 which are generally parallel but are spaced from each other. These baffles extend completely across the chambers 36 and 38 and are sealed thereto at their periphery. However, each of the baffles 52 has several openings 55 through it, only one thereof being shown in each baffle 52, and the openings in one baffle are offset from those in the other. Thus a labyrinthine path is provided among the baffles to disturb the fluid flow through the chambers 36 and 38. Since the liquid is heavier than the gas, the baffles thereby act to remove entrained liquid from the exiting gas stream and insure a sufficient supply liquid to the annulus 16.

The bottom of each of chambers 36 and 38 is provided with conduits, 64 and 66, respectively, of substantially the same diameter as conduits 12 and 14. The conduits 64 and 66 terminate against the undersurface of the lower of the baffles 52. Within the chambers, each of conduits 64 and 66 is provided with slots as at 68 to discharge or receive fluid from the lower of baffles 52. The conduits then extend externally of the bubble chambers and are sealed as by welding to the ports 12 and 14 of the casing 11.

In operation, the conduits 44 and 46 are in communication with a fluid flow system containing a suitable pressure establishing means (not shown) for applying gas pressure to one or both of chambers 36 and 38 and through their connections to one or both ends of the annulus 16.

Each of chambers 36 and 38 is provided with an electrically energized heating unit 40 and 42, such as a "Calrod" unit. The heating units are suspended from the tops of their respective chambers and extend downwardly into each chamber nearly to the base. Associated with each heating unit 40 and 42 is a liquid level indicator. We prefer to use a resistance-type level indicator of the double-rod type. Details of the construction and operation of such a device may be found in the Liquid Metals Handbook, Third edition, pages 345 to 350.

For careful control of temperatures we place thermostats at various points on the apparatus. Thermostats may be suitably placed at the points in Figure 2 marked T. The use of a thermostatically controlled on-off switch is generally effective to maintain the temperature at a desired level.

It may be noted that it is immaterial which chamber is used as the inlet or outlet for passing fluid through the annulus 16 since the construction illustrated is suitable for use for the control of fluid flowing in either direction. The chambers 36 and 38 are mirror images of each other.

The operation of the freeze seal is simple and may be conveniently described in connection with the valving of a fusible metal such as sodium and a gas such as helium. It should be noted, however, that it is not intended to limit the present invention to these particular fluids. For practical purposes the melting point of the metal used should not exceed over about 1000° F. and the gas used should be chemically inert to whatever liquefied metal flows through the valve. To illustrate the operation, assume that pipe 44 is the inlet and connected to a source of sodium and a pressure establishing means and that pipe 46 is the outlet end and is connected to a similar pressure establishing means and other equipment. To initiate flow through the valve, the "Calrod" heaters 40 and 42 in the bubble chambers 36 and 38 and in the well 13 are energized to raise the temperature to a value at which the sodium is liquid (at least about 208° F.). Liquefied sodium or gas may then be flowed through the valve. The sodium or gas passes from the external source through pipe 44, slots 62 into the cup 51. The sodium or gas then flows over the wall of cup 51 and down between the baffles 50 and through the openings 55 of baffles 52, thence through the slots 68 and conduit 64 into and through the annulus 16. Flow of gas alone tends to blow all of the sodium out of the annulus and out of the chambers 36 and 38. However, the labyrinthine passages in the chambers act to insure that a sufficient volume of sodium will be retained to form a leak tight seal in the annulus 16. The mixture of liquid and gas passing through the bubble chambers is forced to follow a tortuous passage. The baffles provide rapid changes of direction and thereby entrained liquid, being heavier than the gas, impinges upon and drains away from the baffles. The gas passing through the outlet chamber is finally dried by the cup 51 at the upper end of the chamber 38 by forcing the gas through two 180° turns.

When valving action is desired, the liquid level in the bubble chambers is equalized by applying equal pressure to both sides of the seal. All heating elements are then turned off. If the initial temperature is above 500° F. two-step cooling is used. First compressed air is flowed through coolant inlet 26 into annulus 58 whence it flows through conduit 28 and out through coolant outlet 30. The flow is continued until the temperature reaches about 400° F. The air is then shut off and water at about 100° F. is passed through the same cooling passages. If the initial temperature is below 500° F., then only water is passed through the cooling passages. Water flow is continued until all parts of the seal reach the desired temperature and the sodium solidifies. When the sodium freezes in the annulus, a mass spectrometer leak-tight barrier to the passage of helium is attained.

To permit gas flow through the valve, the sodium seal is first melted, as indicated before. Then the gas is flowed through the valve. The pressure of gas tends to push the sodium out of the annulus 16 and through bubble chamber 36. Any surge of gas through the annulus 16 creates large bubbles in the liquid sodium that might carry a considerable quantity of sodium out of the annulus and the bubble chambers. The supply of sodium would thus be depleted to such an extent that a leak-tight seal could not be attained. However, the labyrinthine passage in the outlet chamber breaks up the bubbles and removes the sodium entrained in the gas stream. An adequate sodium supply is thus assured.

The size of the bubble chambers 36 and 38 affects the operating characteristics of the freeze seal. Larger chambers are greater heat reservoirs and cause longer times for thawing to obtain a clear passage for gas. Larger chambers also require more time for freezing the entire contents of the seal. The cooling medium cannot be shut off until the entire contents are frozen without running the risk that the seal will re-thaw itself. Smaller chambers allow quicker thawing times and require less time for complete freezing.

We have conducted leak checks to determine the effectiveness of the frozen sodium barrier in the freeze seal apparatus of the present invention. Our tests have shown that no helium leakage can be detected across the frozen annular seal using a mass spectrometer having a sensitivity of .001 micron cubic foot per hour. The tests were conducted with a 200 p.s.i. differential pressure across the annular passage 16 and with the apparatus at ambient temperatures in the range 70 to 190° F.

Since many embodiments might be made of the present invention and since many changes might be made in the embodiment described, the present invention is to be interpreted as illustrative only and not in a limiting sense.

We claim:

1. A freeze valve comprising an annular passageway for fluid flow having inlet and outlet conduits and adapted to contain a fusible metal, a chamber connected to said outlet conduit, baffles within the interior and disposed transversely to the longitudinal axis of said chamber for separating gas from liquefied metal, a heat conductive block positioned within and in heat conductive relation to said annular passageway, heating means imbedded in said block, and a cooling unit chambered in said block having an inlet for admitting coolant and an outlet for discharging the coolant.

2. A valve for use in controlling the flow of a liquefied metal and a gas, said valve comprising a casing having an outer and an inner spaced concentric wall defining an annular passage for fluid flow, said outer wall having an inlet and an outlet port to conduct fluid through the annular passage, said inner wall defining a well, a heat conductive block positioned within said well and in heat transfer relation with said annular passage, said block containing a heating element imbedded therein for maintaining the metal in a fluid state and cooling means in said block for freezing the liquefied metal to form a leak tight seal to the passage of fluid.

3. A valve for use in controlling the flow of a liquefied metal and a gas, said valve comprising a casing having an outer and an inner spaced concentric wall defining an annular passage for fluid flow, said outer wall having an inlet and an outlet port to conduct fluid through the annular passage, said inner wall defining a well, a heat conductive block positioned within said well and in heat transfer relation with said annular passage, said block containing a heating element imbedded therein for maintaining the metal in a fluid state and cooling means in said block for freezing liquefied metal to form a leak tight seal to the passage of fluid and bubble chamber means connected with said ports to prevent liquid metal from being blown out of the annular passage.

4. A freeze valve for use in controlling the flow of a gas comprising an annular casing filled with a fusible metal and having inlet and outlet conduits, a bubble chamber connected to the outlet conduit, baffles within the interior of said chamber and transverse to the direction of fluid flow for separating gas from said fusible metal to pass said gas alone, heating means to liquefy the metal in the annular casing and cooling means to freeze liquid in the annular casing thereby forming a leak tight barrier to the passage of gas, said heating and cooling means located within and surrounded by said annular casing.

5. A freeze valve comprising an annular passageway for fluid flow having inlet and outlet conduits, said passageway being filled with a fusible metal, said conduits being interchangeable, a bubble chamber formed in said inlet conduit, a bubble chamber formed in said outlet conduit, baffles within the interiors and disposed transversely to the longitudinal axes of said chambers for separating gas from liquefied metal, a heat conductive block positioned within and in heat conductive relation to said annular passageway, heating means imbedded in said block and a cooling unit chambered in said block and having an inlet for admitting coolant and an outlet for discharging the coolant.

6. A valve for the regulation of gas and fusible metal flow comprising, in combination, a casing having inlet and outlet conduits, said casing containing said fusible metal, a chamber connected to said outlet conduit, said chamber containing means for separating said gas from liquefied metal, and positive flow selective means within said casing and surrounded by said fusible metal including heating means to heat said metal to a liquid condition and thereby permit flow under pressure of said gas through said liquid metal and cooling means to cool said metal into a fused state and thereby close said valve to all flow.

7. A valve for the regulation of gas and fusible metal flow comprising, in combination, a casing having inlet and outlet conduits, said casing forming an annular passageway therein filled with said fusible metal, a chamber connected to said outlet conduit, said chamber containing means for separating said gas from liquefied metal, and positive flow selective means within said casing and surrounded by said annular passageway including heating means to heat said metal to a liquid condition and thereby permit flow under pressure of said gas through said liquid metal and cooling means to cool said metal into a fused state and thereby close said valve to all flow.

References Cited in the file of this patent

UNITED STATES PATENTS

| | | |
|---|---|---|
| 1,292,603 | Hohman | Jan. 28, 1919 |
| 1,602,887 | De Florez | Oct. 12, 1926 |
| 1,805,963 | Toncray | May 19, 1931 |
| 1,906,636 | Schlecker | May 2, 1933 |
| 1,917,895 | McGrath | July 11, 1933 |
| 2,646,065 | Tyson | July 21, 1953 |
| 2,698,630 | McShurley | Jan. 4, 1955 |
| 2,717,032 | Dupin | Sept. 6, 1955 |
| 2,834,360 | Stubblefield | May 13, 1958 |